United States Patent
Chen et al.

(10) Patent No.: US 9,797,726 B2
(45) Date of Patent: Oct. 24, 2017

(54) REDUCED-ORDER FAIL-SAFE IMU SYSTEM FOR ACTIVE SAFETY APPLICATION

(71) Applicant: GM GLOBAL TECHNOLOGY OPERATIONS LLC, Detroit, MI (US)

(72) Inventors: Shih-Ken Chen, Troy, MI (US); Nikolai K. Moshchuk, Grosse Pointe, MI (US); Bakhtiar B. Litkouhi, Washington, MI (US); Jin-Jae Chen, Canton, MI (US); David M. Sidlosky, Beverly Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 63 days.

(21) Appl. No.: 14/822,231

(22) Filed: Aug. 10, 2015

(65) Prior Publication Data
US 2017/0043785 A1   Feb. 16, 2017

(51) Int. Cl.
*G01C 21/16* (2006.01)
*G01P 15/00* (2006.01)

(52) U.S. Cl.
CPC .............. *G01C 21/16* (2013.01); *G01P 15/00* (2013.01)

(58) Field of Classification Search
CPC ........ G01C 21/16; G01C 25/005; G01P 15/00; G01P 3/00
USPC ......... 701/29.1, 36, 45, 32.9, 472, 511, 505; 702/92, 141, 145, 151; 73/504.02, 504.08
See application file for complete search history.

(56) References Cited

U.S. PATENT DOCUMENTS

| | | | |
|---|---|---|---|
| 4,914,598 A * | 4/1990 | Krogmann ............. | G01C 21/16 244/177 |
| 6,240,367 B1 * | 5/2001 | Lin ........................ | G01C 21/28 342/357.31 |
| 6,516,021 B1 | 2/2003 | Abbott et al. | |
| 8,056,412 B2 | 11/2011 | Rutkiewicz et al. | |
| 8,311,739 B2 * | 11/2012 | Huddle .................. | G01C 21/16 342/357.21 |

* cited by examiner

*Primary Examiner* — Dalena Tran
(74) *Attorney, Agent, or Firm* — Quinn IP Law

(57) ABSTRACT

A reduced-order fail-safe inertial measurement unit system. A first inertial measurement unit device includes a plurality of accelerometers measuring linear accelerations and gyroscopes measuring angular velocities. A second inertial measurement unit device includes a reduced number of accelerometers and gyroscopes relative to the first inertial measurement unit device measuring at least two linear accelerations and at least one angular velocity. A processor receives acceleration data from the first and second inertial measurement units. The processor detects faulty data measurements from the first inertial measurement unit. The processor supplements the faulty data measurements of the first inertial measurement unit with transformed data generated as a function of the measurement data from the second inertial measurement unit. The processor applies predetermined transformation solutions to transform the measurement data from the second inertial measurement unit into the transformed data. The processing unit provides the transformed data to the safety applications of the vehicle.

18 Claims, 3 Drawing Sheets

REDUCED-ORDER FAIL-SAFE IMU SYSTEM FOR ACTIVE SAFETY APPLICATION

BACKGROUND OF INVENTION

The present invention relates generally to fail-safe Inertial Measurement Unit (IMU) systems.

Critical safety systems such as those used in a vehicle typically utilize controllers to monitor vehicle operating conditions and employ controlling strategies for vehicle safety functionality and operations. In controllers that monitor safety-related operations, a redundant controller is required. For example, an IMU used to sense linear accelerations of a vehicle is typically a 5 degree of freedom (DOF) or 6 DOF IMU. For backup purposes should the IMU fail, a redundant IMU is utilized. The redundant IMU is identical to the main IMU having the same DOF. However, utilizing an identical IMU having the same DOF is expensive. As a result, it would be beneficial to reduce the cost and burden of utilizing redundant IMUs, but still maintain the safety monitoring and controls of the primary IMU.

SUMMARY OF INVENTION

An advantage of an embodiment is the reduction in cost in eliminating a duplicate IMU used for safety related applications and the utilization of a combination full-order IMU and a reduced-order IMU. The system utilizes predetermined transformation solutions to determine unknown angular velocities of the first inertia measurement unit affected by a fault in the main IMU. The respective angular velocities are calculated as a function of a known angular velocity measurement value of the second inertial measurement unit, known linear accelerations measurement values of the first and the second inertial measurement unit, and predetermined transformation intermediate variables that are derived from data from the main IMU prior to the detection of the fault. The respective linear accelerations and angular velocities are provided to controllers such as safety controllers to maintain functionality of a safety application while the driver of the vehicle is notified of the fault, and is instructed to take manual control of the vehicle operation associated with the safety application.

An embodiment contemplates a reduced-order fail-safe inertial measurement unit system. A first inertial measurement unit device is mounted on a vehicle. The first inertial measurement unit device includes a plurality of accelerometers measuring linear accelerations and gyroscopes measuring angular velocities. A second inertial measurement unit device is mounted on the vehicle. The second inertial measurement unit device includes a reduced number of accelerometers and gyroscopes relative to the first inertial measurement unit device. The second inertial measurement unit measures at least one linear acceleration and at least one angular velocity. A processor receives acceleration data from the first inertial measurement unit and the second inertial measurement unit. The processor detects faulty data measurements from the first inertial measurement unit. The processor supplements the faulty data measurements of the first inertial measurement unit with transformed data generated as a function of the measurement data from the second inertial measurement unit. The processor applies predetermined transformation solutions to transform the measurement data from the second inertial measurement unit into the transformed data. The processing unit provides the transformed data to the safety applications of the vehicle.

DETAILED DESCRIPTION

Figure 1:
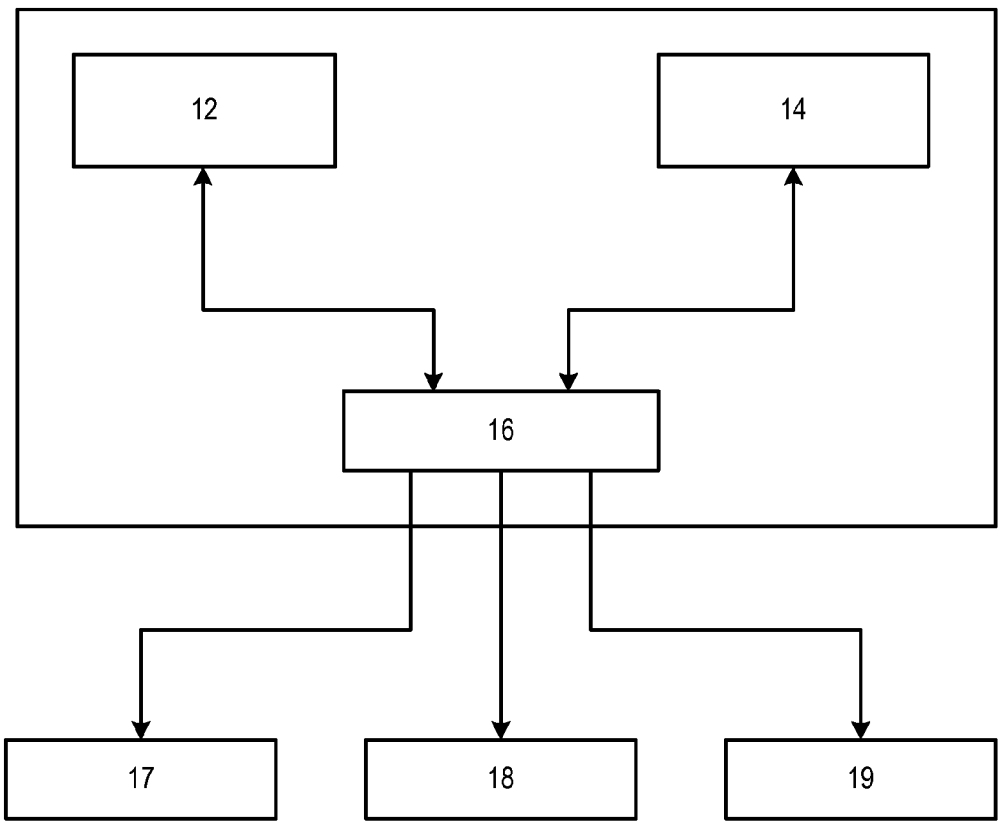
FIG. 1 is block diagram of an inertia monitoring system

FIG. 1 describes a system that includes a first Inertial Measurement Unit (IMU) 12 and a second IMU 14. The first IMU 12 is full-order IMU such that a six IMU or five-DOF IMU is utilized.

The six-DOF IMU utilizes three components of linear accelerations (hereinafter referred to as linear attributes) and three components of angular velocities (hereinafter referred to as angular attributes). The three components of translation typically include directions an x-y-z coordinate system. The three components of rotation include rotational attributes such a pitch, yaw, and roll.

A redundant or semi-redundant IMU is required for safety applications so that vehicle can continue functioning if a fault occurs in a primary IMU.

Typically if a fault occurs with respect to the IMU, certain functions that are active, such as adaptive cruise control or other autonomous or semi-autonomous vehicle applications, require that such features be shut down and control of those features be relinquished to the driver of the vehicle. However, the system does not want to abruptly terminate automated features/controls until the driver is warned and control of the features for such applications is relinquished to the driver. Under such conditions, it is pertinent that the safety features remain operational for a respective amount of time (e.g. 5-10 sec) so that the driver of the vehicle can retain control of those features of the vehicle. The duration of time that is required depends on the feature or features that are currently active and the estimated time that would be necessary to work the driver and for the driver to take control of the system.

Prior systems are known to use full-order redundant systems where the main IMU and backup IMU are identical. This is costly to utilize a full-order backup IMU. However, such failures of the main IMU are only partial failures, and as a result, not all of the dynamics of the six-DOF IMU are decoupled. That is, a failure in the first IMU 12 may only affect a single attribute of the IMU (e.g., one of the gyroscopes), and as a result, a majority of the attributes are still operational and providing valid data. Therefore, a reduced-order IMU may provide supplemental data for at least a duration of time that is necessary to regain manual control of the application by the driver.

A reduced order IMU, such as a three-DOF IMU utilizes a reduced number of linear attributes and/or angular attributes relative to the six-DOF IMU. Preferably, the three-DOF utilizes a combination of the linear attributes and angular attributes. For example, the three-DOF may use x-direction accelerometer, y-direction accelerometer, and yaw rate. It should be understood that the invention is not limited to the exemplary three-DOF described above, and may utilize any combination that is designed for the vehicle. In addition, the exemplary system as described herein is vehicle based, but the architecture can apply to non-vehicular systems as well.

These respective IMUs may be part of a safety external object detection system that senses external objects about the vehicle and monitors the vehicle operating conditions to determine safe vehicle operations for either alerting the driver of the vehicle or for controlling autonomous or semi-autonomous operations of the vehicle. For example, the data processed by the processor may be supplied to various subsystems that include, but are not limited to, autonomous braking subsystems 17, autonomous steering subsystems 18, and autonomous speed control subsystems 19. These subsystems may function independently or in cooperation with one another. It should be also understood that the system as described herein is not limited to an automobile but may be used in other types of applications that utilize two IMUs including, but not limited to, planes, ships, and trains.

The first IMU 12 is typically positioned close to the center of gravity of the vehicle. The location of the first IMU 12 is identified during the design and development stages of the vehicle and the location is selected based on the location that can provide the optimum inertia measurements for the vehicle. The location of the second IMU 14 is determined during the design and development stages of the vehicle and is required to be offset at least a predetermined distance from the first IMU 12. Therefore, an absolute position of the second IMU 14 within the vehicle is not required; rather, it is a relative relationship between the first IMU 12 and the second IMU 14 that is pertinent.

A selection for a location of the second IMU 14 should preferably meet the criteria that includes, but is not limited to, noise frequency not to exceed a predetermined number of times the natural frequency of the vehicle (e.g., 5×). This predetermined number is configurable and is based on experimental and/or simulation studies conducted on the location of the IMU location. A second requirement includes a noise amplitude not to exceed a predetermined percentage of the range. If the actual noise amplitude is above the predetermined percentage, then the transformation technique as describe herein cannot readily correlate sensor measurements between the locations of the two IMUs. A third requirement is the data should be raw sensor data and not filtered data. A fourth requirement is that the location of the IMUs must be at least a predetermined distance from one another.

To supplement the redundant data (i.e., data found to be in error) from the first IMU 12, solutions are identified for determining each respective attribute (e.g., accelerometer data). The solutions utilize known variable measurements sensed by the first IMU 12, and transformation intermediate variables that can be derived from measurements of the second IMU 14. However, due to the offset between the first IMU 12 and the second IMU 14, the absolute measurements of the second IMU 14 are not directly replaceable by the absolute measurements of the first IMU 12. Rather, transformation intermediate variables along with solutions are used to correlate data from the second IMU 14 with data from the first IMU 12 based on the relative displacement between the respective IMUs. Moreover, it should be understood that second IMU 14 must be offset from the first IMU 12 in order for the technique described herein to apply.

Figure 2:
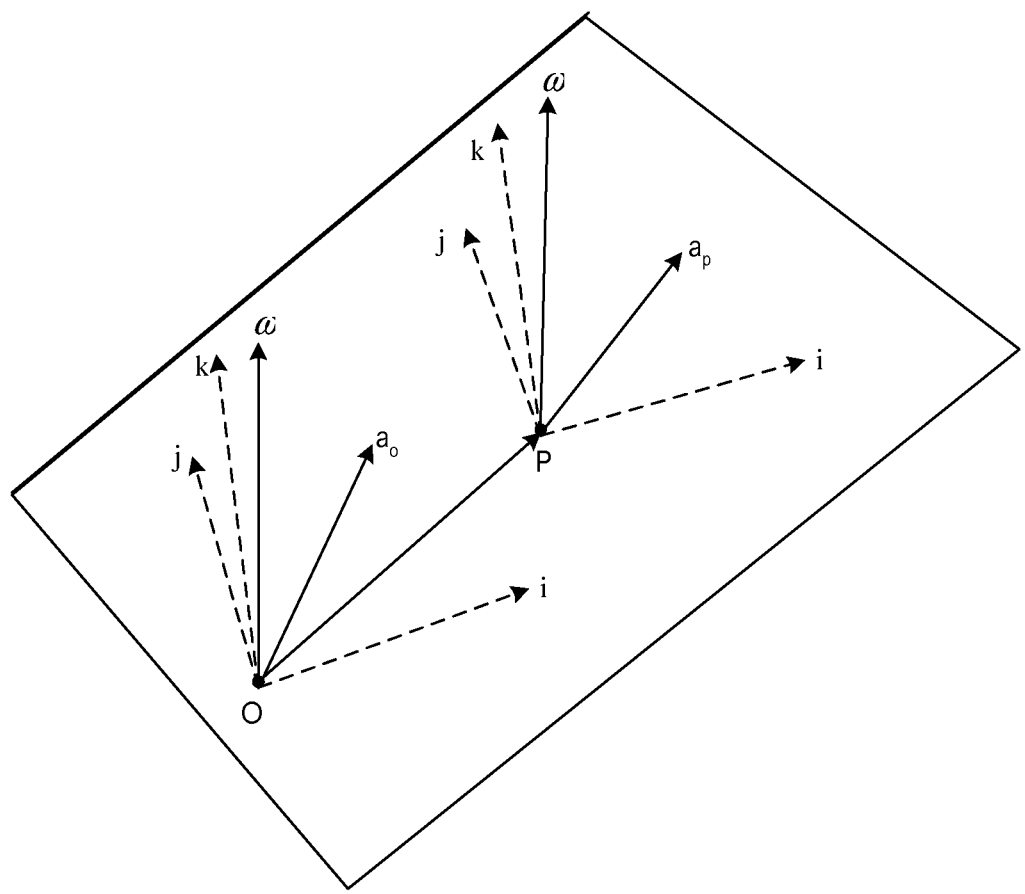
FIG. 2 is a vector model of the locations of the IMUs

The following describes the technique for supplementing data from the second IMU 14 with the failure data from the first IMU 12. An assumption is made that both IMUs (e.g., accelerometers and gyroscopes) are fixed to the vehicle body such that their axes are co-directed. Vehicle body is assumed to be a rigid body, i.e. any structural compliance is ignored. A vector model is shown in FIG. 2 for two reference frames represented by the first IMU 12 at point O and the second IMU 14 represented by point P. Absolute positions are not necessary since the technique described herein utilizes a relative relationship between the two bodies. A coordinate vector between the origins of two reference frames for linear attributes can be represented by the following:

$$OP = x_P i + y_P j + z_P k, \qquad (1)$$

and angular attributes can be represented by the following expression:

$$\omega = \omega_x i + \omega_y j + \omega_z k. \qquad (2)$$

Here $\omega$ is the angular velocity vector of the vehicle body.

The relation between the velocities of two points P and O of a rigid body in terms of its angular velocity has the following form:

$$V_P - V_0 = \omega \times OP \qquad (3)$$

where $V_P$ and $V_0$ are velocity measurements of the second IMU and the first IMU, respectively.

Taking the time derivative of eq. (3) generates the equation in the form of acceleration:

$$a_P - a_0 = \dot{\omega} \times OP + \omega \times (\omega \times OP) \qquad (4)$$

where $a_P$ and $a_0$ are absolute acceleration measurements from accelerometers and $\dot{\omega}$ is the angular acceleration vector.

Using a standard identity of double cross vector products and taking a dot product of the both sides of eq. (4) and the vector OP generates the following expression:

$$(a_P - a_0) \cdot OP = (\omega \cdot OP)^2 - |OP|^2 |\omega|^2 \qquad (5)$$

Here a known identity $$(\dot{\omega} \times OP) \cdot OP = 0 \qquad (5a)$$

has been applied.

Eq. (4) generates the following vector differential equation for angular velocity vector $\omega$:

$$\dot{\omega} \times OP = a_P - a_0 - \omega \times (\omega \times OP) \equiv b \qquad (6)$$

or in scalar form $$z_P \dot{\omega}_y - y_P \dot{\omega}_z = b_x$$

$$-z_P \dot{\omega}_x + x_P \dot{\omega}_z = b_y$$

$$y_P \dot{\omega}_x - x_P \dot{\omega}_y = b_z \qquad (7)$$

where vector b is defined as follows:

$$b_x = -a_{0x}(t) + a_{px}(t) + x_P \omega_y(t)^2 + x_P \omega_z(t)^2 - y_P \omega_x(t)\omega_y(t) - z_P \omega_x(t)\omega_z(t) \qquad (8)$$

$$b_y = -a_{0y}(t) + a_{py}(t) + y_P \omega_x(t)^2 + y_P \omega_z(t)^2 - x_P \omega_x(t)\omega_y(t) - z_P \omega_y(t)\omega_z(t) \qquad (9)$$

$$b_z = -a_{0z}(t) + a_{pz}(t) + z_P \omega_x(t)^2 + z_P \omega_y(t)^2 - x_P \omega_x(t)\omega_z(t) - y_P \omega_y(t)\omega_z(t) \qquad (10)$$

System of differential equation (7) with respect to components of angular velocities is degenerate, since the determinant of the system represented by the left hand side of eq. (3) is zero. Consequently, the following condition holds true:

$$x_P b_x + y_P b_y + z_P b_z = 0. \qquad (11)$$

The condition shown in eq. (11) is equivalent to the condition in eq. (5a). Condition (5a) or (11) holds for ideal signals under rigid body assumption. In reality all measurements contain noise and identity (8) is no longer exact. However, eq. (7) can be used for estimating two "unknown" angular velocities components as long as a third angular velocity component is known. The following three scenarios may be used to determine unknown angular accelerations given known respective parameters.

In a first scenario, the following components of the reduced order IMU are available: z-component of the angular velocity vector $\omega_z(t)$, and x and y components of the linear acceleration $a_{px}(t)$, $a_{py}(t)$. Two unknown components of the angular velocity vector $\omega_x$ and $\omega_y$ satisfy the following system of two nonlinear differential equations:

$$\dot{\omega}_x = -\frac{y_p}{z_p}\omega_x^2 + \frac{x_p}{z_p}\omega_x\omega_y + \tag{12}$$

$$\omega_z(t)\omega_y - [-x_p\dot{\omega}_z(t) + a_{py} - a_{oy} + y_p\omega_z^2(t)]/z_p$$

$$\dot{\omega}_y = \frac{x_p}{z_p}\omega_y^2 - \frac{y_p}{z_p}\omega_x\omega_y -$$

$$\omega_z(t)\omega_x + [y_p\dot{\omega}_z(t) + a_{px} - a_{ox} + x_p\omega_z^2(t)]/z_p$$

where $\omega_y$ and $\omega_x$ are unknown angular velocities components determined after a detected failure, $a_{ox}$, $a_{oy}$ are known linear accelerations components of the first inertial measurement unit, $a_{px}$, $a_{py}$ are known linear accelerations components of the second inertial measurement unit, $x_p$, $y_p$, $z_p$ are coordinates of the origin of the second IMU with respect to the first IMU, $\dot{\omega}_z$ and $\omega_z$ are known angular velocity rate and angular velocity of the second inertia measurement unit.

The above equations (12) can be approximately solved in real time using, for example, Euler method. All measurements in equations (12) contain noise, therefore, equations (12) are, in fact, stochastic equations. The online numerical solution will satisfy the performance requirements only during some finite interval of time.

In a second scenario, the following components of the reduced order IMU are available: y-component of the angular velocity vector $\omega_y(t)$, and x and z components of the linear acceleration $a_{px}(t)$, $a_{pz}(t)$. Two unknown components of the angular velocity vector $\omega_x$ and $\omega_z$ satisfy the following system of two nonlinear differential equations:

$$\dot{\omega}_x = \tag{13}$$

$$\frac{z_p}{y_p}\omega_y^2 - \frac{x_p}{y_p}\omega_x\omega_z - \omega_z(t)\omega_y + [x_p\dot{\omega}_y(t) + a_{pz} - a_{oz} + z_p\omega_y^2(t)]/y_p$$

$$\dot{\omega}_z = -\frac{x_p}{z_p}\omega_z^2 + \frac{z_p}{z_p}\omega_x\omega_z +$$

$$\omega_z(t)\omega_x + [-z_p\dot{\omega}_y(t) + a_{px} - a_{ox} + x_p\omega_y^2(t)]/z_p$$

where $\omega_z$ and $\omega_x$ are unknown angular velocity components determined after a detected failure, $a_{ox}$, $a_{oz}$ are known linear accelerations components of the first inertial measurement unit, $a_{px}$, $a_{pz}$ are known linear accelerations components of the second inertial measurement unit $x_p$, $y_p$, $z_p$ are coordinates of the origin of the second IMU with respect to the first IMU, $\dot{\omega}_y$ is a known angular velocity rate and $\omega_y$ is a known angular velocity of the second inertia measurement unit. Analogously to Scenario 1, the above equations (13) can be approximately solved in real time using, for example, Euler method.

In the third scenario, the following components of the reduced order IMU are available: x-component of the angular velocity vector $\omega_x(t)$, and x and z components of the linear acceleration $a_{py}(t)$, $a_{pz}(t)$. Two unknown components of the angular velocity vector $\omega_y$ and $\omega_z$ satisfy the following system of two nonlinear differential equations:

$$\dot{\omega}_y = -\frac{z_p}{x_p}\omega_y^2 + \frac{y_p}{x_p}\omega_y\omega_z + \tag{14}$$

$$\omega_x(t)\omega_z - [-y_p\dot{\omega}_x(t) + a_{pz} - a_{oz} + z_p\omega_x^2(t)]/x_p$$

$$\dot{\omega}_z = \frac{y_p}{x_p}\omega_z^2 - \frac{z_p}{x_p}\omega_y\omega_z -$$

$$\omega_x(t)\omega_y + [z_p\dot{\omega}_x(t) + a_{py} - a_{oy} + y_p\omega_x^2(t)]/x_p$$

where $\omega_y$ and $\omega_z$ are unknown angular velocity components determined after a detected failure, $a_{oy}$, $a_{oz}$ are known linear accelerations components of the first inertial measurement unit, $a_{py}$, $a_{pz}$ are known linear accelerations components of the second inertial measurement unit $x_p$, $y_p$, $z_p$ are coordinates of the origin of the second IMU with respect to the first IMU, $\dot{\omega}_x$ is a known angular velocity rate and $\omega_x$ is a known angular velocity of the second inertia measurement unit.

Analogously to the first and second scenarios, the above equations (14) can be approximately solved in real time using, for example, Euler method.

To obtain data to solve for the respective parameters in eq. (12)-(14), sampling will be applied to obtain the three-DOF IMU signals (e.g., $a_x$, $a_y$, and yaw rate) and transformation expressions (12)-(14) that will be used to derive the redundant signals. Sampling may be based on a predetermined number of samples at a respective time interval (e.g., 10 samples at 10 ms). The samples utilized are obtained at a time just prior to the failure detection of the first IMU. It should be understood that the number of samples in addition to the sampling rate may vary depending on the different vehicle attributes that include, but are not limited to, type of vehicle, what system the information is being utilized for, processor capability, memory storage.

The estimation will be applied for a predetermined amount of time while the driver is alerted of the error and directed to take control of the vehicle operation if an autonomous or semi-autonomous operation is enabled. The predetermined amount of time may vary based on various vehicle characteristics including, but not limited to, type of error, the system that is being disabled, or the number of systems that need to be disabled.

Figure 3:
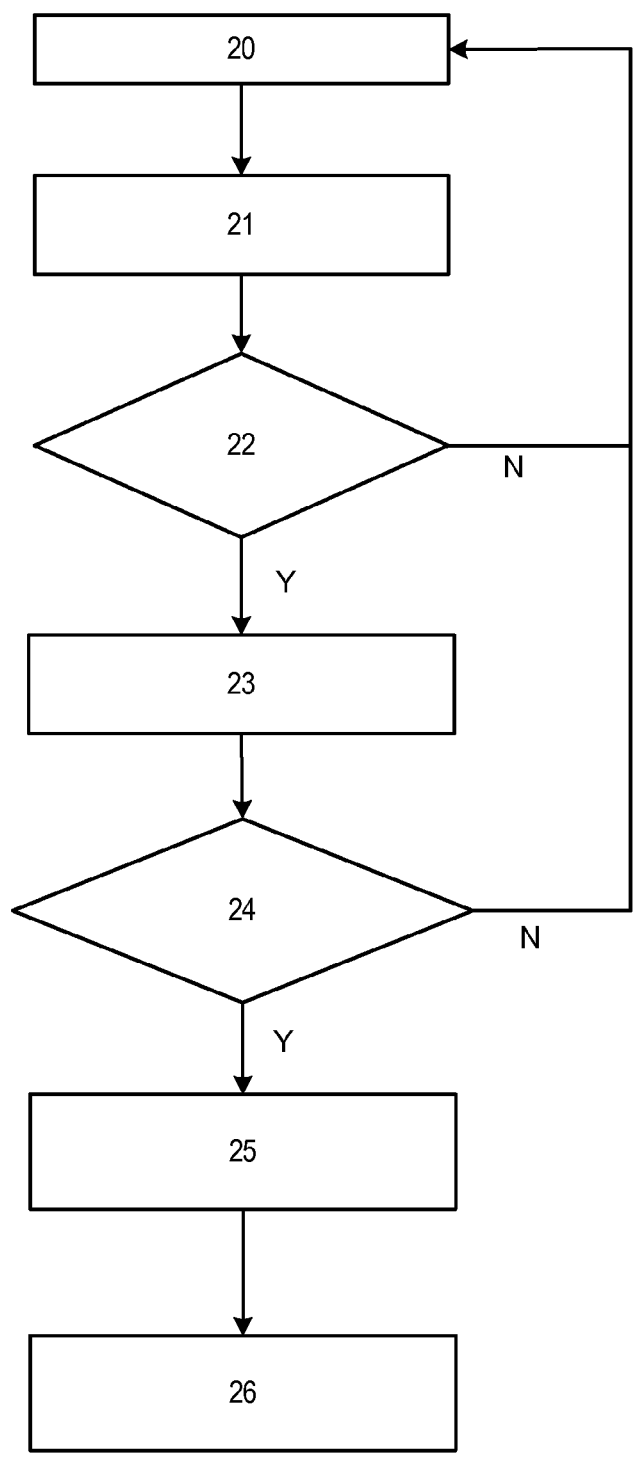
FIG. 3 a flowchart for a method for the overall process for recovering the faulted signals.

FIG. 3 is a flowchart for a method for the overall process for recovering the faulted signals based on the techniques described herein.

In step 20, the technique is initiated. In step 21, all data from the IMU is stored for the past predetermined number of samples.

In step 22, a determination is made as to whether the first IMU has failed. If the determination is made that the first IMU has not failed, then the routine returns to step 20 to continue monitoring the first IMU. If the determination that a fault has occurred with the first IMU, then the routine proceeds to step 22.

In step 23, a sample average is determined based on the predetermined number of samples just prior to the failed signal.

In step 24, a determination is made as to whether the average noise amplitude is less than the predetermined percentage of the sensor range. If the determination is made that the amplitude is above the predetermined percentage, then a return is made to step 20. If the determination is made that the amplitude less than the predetermined percentage, then the routine proceeds to step 24.

In step 25, recovered signals not obtained by the first IMU are calculated based on the measurement data from the second IMU and the derived differential equations for $\omega$.

In step 26, the recovered signals are provided to a controller for maintaining operation of a respective safety feature for a predetermined time period to allow the driver to resume manual control the feature.

While certain embodiments of the present invention have been described in detail, those familiar with the art to which this invention relates will recognize various alternative designs and embodiments for practicing the invention as defined by the following claims.

What is claimed is:

1. A reduced-order fail-safe inertial measurement unit system comprising:
   a first inertial measurement unit device mounted on a vehicle, the first inertial measurement unit device including a plurality of accelerometers measuring linear accelerations and angular velocities;
   a second inertial measurement unit device mounted on the vehicle, the second inertial measurement unit device including a reduced number of accelerometers relative to the first inertial measurement unit device, the second inertial measurement unit measuring at least two linear accelerations and at least one angular velocity;
   a processor receiving acceleration data from the first inertial measurement unit and the second inertial measurement unit, the processor detecting faulty data measurements from the first inertial measurement unit, the processor supplementing the faulty data measurements of the first inertial measurement unit with transformed data generated as a function of the measurement data from the second inertial measurement unit, the processor applying predetermined transformation solutions to transform the measurement data from the second inertial measurement unit into the transformed data, and wherein the processing unit provides the transformed data to the safety applications of the vehicle;
   wherein the processor applies the predetermined transformation solutions to determine two unknown angular velocities of the first inertia measurement unit, wherein the unknown angular velocities are calculated as a function of a known angular velocity measurement value of the first inertial measurement unit, a known linear acceleration measurement value of the first inertial measurement unit, and predetermined transformation intermediate variables.

2. The system of claim 1 wherein the processor utilizes data from the second inertial measurement unit after a detection of a fault from the first inertial measurement unit in cooperation with data from the first inertial measurement unit prior to the detected fault for determining unknown angular velocity rates.

3. The system of claim 1 wherein determination of the two unknown angular velocity rates are determined as follows:

$$\dot{\omega}_x = -\frac{y_p}{z_p}\omega_x^2 + \frac{x_p}{z_p}\omega_x\omega_y + \omega_z(t)\omega_y - [-x_p\dot{\omega}_z(t) + a_{py} - a_{oy} + y_p\omega_z^2(t)]/z_p,$$

$$\dot{\omega}_y = \frac{x_p}{z_p}\omega_y^2 - \frac{y_p}{z_p}\omega_x\omega_y - \omega_z(t)\omega_x + [y_p\dot{\omega}_z(t) + a_{px} - a_{ox} + x_p\omega_z^2(t)]/z_p$$

where $\omega_y$ and $\omega_x$ are unknown angular velocities components determined after a detected failure, $a_{ox}, a_{oy}$ are known linear accelerations components of the first inertial measurement unit, $a_{px}, a_{py}$ are known linear accelerations components of the second inertial measurement unit, $x_p, y_p, z_p$ are coordinates of the origin of the second inertial measurement unit with respect to the first inertial measurement unit, $\dot{\omega}_z$ and $\omega_z$ are known angular velocity rate and angular velocity of the second inertia measurement unit.

4. The system of claim 1 wherein determination of the two unknown angular velocity rate vectors are determined as follows:

$$\dot{\omega}_x = \frac{z_p}{y_p}\omega_x^2 - \frac{x_p}{y_p}\omega_x\omega_z - \omega_z(t)\omega_y + [x_p\dot{\omega}_y(t) + a_{pz} - a_{oz} + z_p\omega_y^2(t)]/y_p$$

$$\dot{\omega}_z = -\frac{x_p}{y_p}\omega_z^2 + \frac{z_p}{y_p}\omega_x\omega_z + \omega_z(t)\omega_x + [-z_p\dot{\omega}_y(t) + a_{px} - a_{ox} + x_p\omega_y^2(t)]/y_p$$

where $\omega_x$ and $\omega_z$ are unknown angular velocity components determined after a detected failure, $a_{ox}, a_{oz}$ are known linear accelerations components of the first inertial measurement unit, $a_{px}, a_{pz}$ are known linear accelerations components of the second inertial measurement unit $x_p, y_p, z_p$ are coordinates of the origin of the second inertial measurement unit with respect to the first inertial measurement unit, $\dot{\omega}_y$ is a known angular velocity rate and $\omega_y$ is a known angular velocity of the second inertia measurement unit.

5. The system of claim 1 wherein determination of the two unknown angular velocity rate vectors are determined as follows:

$$\dot{\omega}_y = -\frac{z_p}{x_p}\omega_y^2 + \frac{y_p}{z_p}\omega_y\omega_z + \omega_x(t)\omega_z - [-y_p\dot{\omega}_x(t) + a_{pz} - a_{oz} + z_p\omega_x^2(t)]/x_p$$

$$\dot{\omega}_z = \frac{y_p}{x_p}\omega_z^2 - \frac{z_p}{z_p}\omega_y\omega_z - \omega_x(t)\omega_y + [z_p\dot{\omega}_x(t) + a_{py} - a_{oy} + y_p\omega_x^2(t)]/x_p$$

where $\omega_y$ and $\omega_z$ are unknown angular velocity components determined after a detected failure, $a_{oy}, a_{oz}$ are known linear accelerations components of the first inertial measurement unit, $a_{py}, a_{pz}$ are known linear accelerations components of the second inertial measurement unit, $x_p, y_p, z_p$ are coordinates of the origin of the second inertial measurement unit with respect to the first inertial measurement unit, $\dot{\omega}_x$ is a known angular velocity rate and $\omega_x$ is a known angular velocity of the second inertia measurement unit.

6. The system of claim 1 wherein the first inertia measurement unit includes a six-degree of freedom inertia measurement unit.

7. The system of claim 1 wherein the first inertia measurement unit includes a five-degree of freedom inertia measurement unit.

8. The system of claim 1 wherein the second inertia measurement unit includes a three-degree of freedom inertia measurement unit.

9. The system of claim 1 wherein the first inertial measurement unit and the second inertial measurement unit have a same vector basis.

10. The system of claim 1 wherein the first inertial measurement unit and the second inertial measurement unit are separated by at least a predetermined distance from one another.

11. The system of claim 10 wherein the second inertial measurement unit includes an inherent noise frequency at a respective location, and wherein the noise frequency associated with the second inertial measurement unit does not exceed a predetermined multiple of a natural frequency of the vehicle.

12. The system of claim 11 wherein the acceleration measurement data of the first inertia measurement unit and second inertia measurement unit provided to the processor includes raw sensor data.

13. The system of claim 12 wherein the raw sensor data is unfiltered data.

14. The system of claim 1 wherein the processor continuously determines the transformation data for a predetermined time.

15. The system of claim 14 wherein the predetermined time is a function of a time for a driver to be alerted to a vehicle application associated with the detected failure and to regain manual control of the vehicle application.

16. The system of claim 15 wherein vehicle application is an adaptive cruise control system.

17. The system of claim 15 wherein vehicle application is an adaptive braking system.

18. The system of claim 15 wherein vehicle application is an adaptive steering system.

* * * * *